June 8, 1965 G. C. BRITTEN 3,187,381
APPARATUS FOR MOLDING HOLLOW ARTICLES
Filed April 28, 1961 2 Sheets-Sheet 1
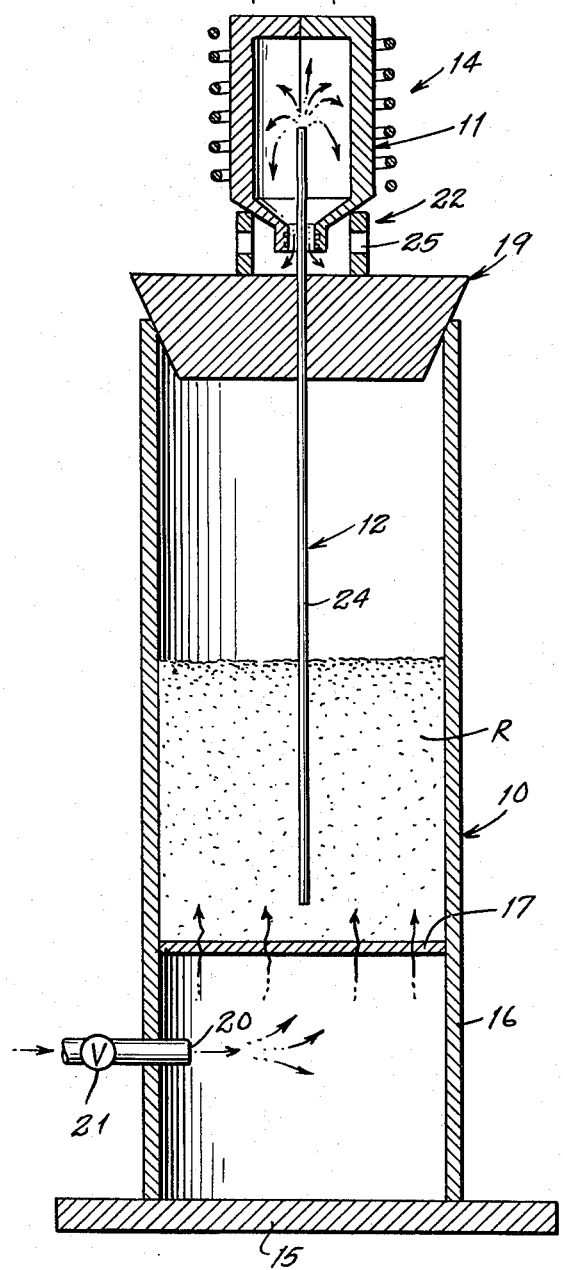
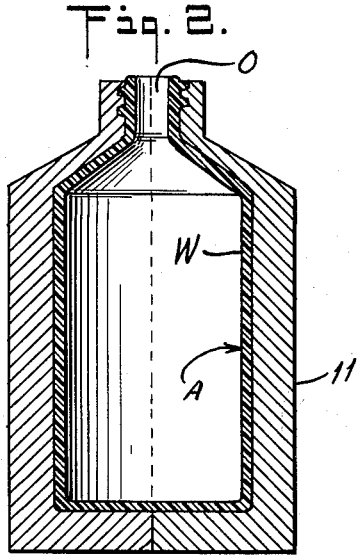
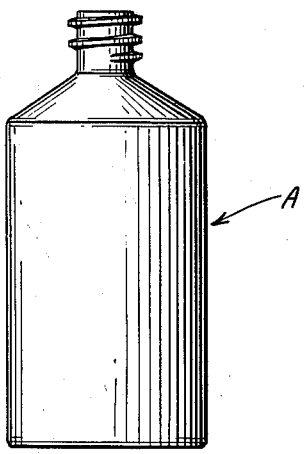
INVENTOR.
GEORGE C. BRITTEN
BY Krazinski & Nolan
ATTORNEYS June 8, 1965   G. C. BRITTEN   3,187,381
APPARATUS FOR MOLDING HOLLOW ARTICLES
Filed April 28, 1961   2 Sheets-Sheet 2

INVENTOR.
GEORGE C. BRITTEN
BY Krazinski & Nolan
ATTORNEYS

United States Patent Office 3,187,381
Patented June 8, 1965

3,187,381
APPARATUS FOR MOLDING HOLLOW ARTICLES
George C. Britten, Massapequa, N.Y., assignor to Injecticon International, Inc., Inwood, N.Y., a corporation of New York
Filed Apr. 28, 1961, Ser. No. 106,264
4 Claims. (Cl. 18—5)

The present invention relates to the formation of hollow articles of plastic resin and, more particularly, to an improved apparatus for molding such articles.

Heretofore, it has been customary to form hollow articles with the use of blank, parison and/or blow molds. Such molds require elaborate mechanisms to operate and control the same, thus making the apparatus costly, as well as providing a relatively low production rate unless multiple molds on a rotating table are employed which latter make the apparatus even costlier.

Accordingly, an object of the present invention is to provide a simple and economical apparatus for forming hollow plastic resin articles.

Another object is to provide such an apparatus for forming hollow articles with or without an opening.

A further object is to provide such an apparatus wherein the wall thickness of the article can be accurately controlled.

A still further object is to provide such an apparatus wherein finely divided plastic resin particles are utilized, which particles are converted to a resinous layer upon being deposited on the inner walls of a mold.

Other and further objects will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by introducing finely divided resin particles into a mold, distributing the particles within the mold to deposit the same substantially uniformly on the inner walls of the mold, heating the mold to cause the particles to be converted to a resinous layer constituting the walls of the hollow article, and removing the article from the mold.

In the drawings,

FIG. 1 is a schematic view of apparatus shown in longitudinal section illustrating one way of carrying out the present invention.

FIG. 2 is a sectional view of a mold having a hollow plastic resin article formed therein by the apparatus shown in FIG. 1.

FIG. 3 is an elevational view of the hollow plastic resin article after removal from the mold.

Figure 4:
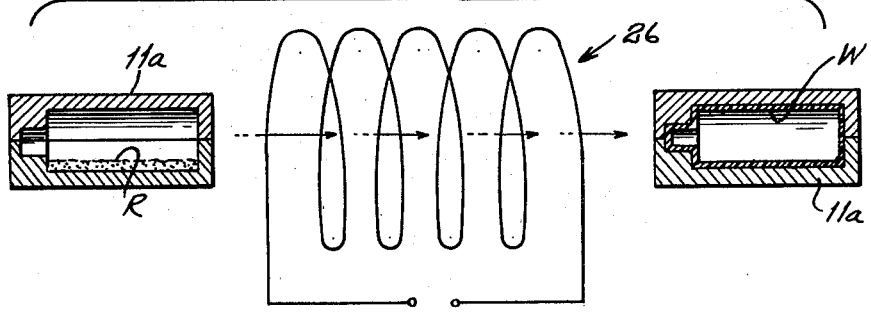
FIG. 4 is a composite schematic operational view, in section, illustrating apparatus for carrying out the present invention in another way.

Referring now to the drawings in detail, and more particularly to FIGS. 1 to 3 thereof, there is shown apparatus for molding a hollow plastic resin article A which apparatus generally comprises a receptacle 10 for finely divided plastic resin particles R, a split mold 11 in which the hollow article is formed, means 12 for conducting the resin particles from the receptacle 10 into the mold to introduce the particles into the mold, and means 14 for heating the mold 11 for the purpose which will be described hereinafter.

The receptacle 10 comprises a bottom 15, a side wall 16 formed with an opening at the upper end thereof, a perforated partition 17 for dividing the receptacle into upper and lower sections and adapted to support a mass of finely divided resin particles R thereon, and a closure 19 for the upper end opening of the receptacle to enable the mass of particles to be replenished. The perforations of the partition are of a size which will not allow resinous particles of about ten microns to pass therethrough, the size of all of the resinous particles being greater than ten microns. The lower section of the receptacle is provided with an inlet 20 controlled by a valve 21 for introducing a gaseous medium under pressure from a source not shown, and the upper section of the receptacle is provided with an outlet in the closure 19 through which the means 12 pass.

The mold 11, shown herein, is of the type for forming a container having an opening 0 at its upper end (FIG. 2) facing the closure 19, the mold being supported on the closure 19 by an apertured collar 22.

The means 12 is a tube 24 which extends from about the upper surface of the partition 17 into the lower end of the mold 11 and to about the center of the mold. This tube 24 is adapted to spray particles substantially uniformly onto the inner walls of the mold which upon the application of heat to the mold are converted into a layer of resin constituting the wall W of the article A. The bore of the tube 24 is dimensioned to conduct particles at a predetermined rate for a given pressure at which the gaseous medium under pressure is introduced and the valve 21 can be manipulated for timing the duration of flow of the particles through the tube to thereby control the wall thickness of the article A.

An advantageous feature of the apparatus shown in FIG. 1 is that the gaseous medium passes through the perforations of the partition 17 and agitates the resin particles before propelling the particles upwardly through the tube 24 by the downward pressure exerted on the particles. This insures that the particles are more uniformly sprayed onto the inner walls of the mold.

The heating means 14 for the mold 11 may be of any conventional type but by way of example is illustrated herein as an inductive heating coil adapted to supply sufficient heat to convert the resin particles to a layer of resin on the inner side walls of the mold, whereinafter the mold is allowed to cool to enable the resinous layer to set.

The collar 22 has openings 25 therein to vent the gaseous medium introduced into the mold with the particles. Excess particles, which are not adhered to the mold, are deposited on the closure 19.

In FIG. 4, apparatus is shown which comprises a split mold 11a for forming an article without an opening, for example ping pong balls, and a coil 26 which is constructed and arranged to generate an inductive field for heating the mold to set the resin particles and to generate an electrostatic field capable of distributing and precipitating the particles on the inner walls of the mold. Apparatus for generating such an electrostatic field is conventional and accordingly a detailed description is not believed essential for an understanding of the present invention.

This apparatus is operated by placing a measured quantity of resin particles in the bottom half of the mold, applying the top half to the bottom half to close the mold, moving the closed mold within the coil 26, applying a potential to the coil to alternately effect inductive heating of the mold and to create the electrostatic field until the resinous layer constituting the walls of the article has been formed, then removing the mold from the coil, and opening the mold and removing the article therefrom.

Figure 5:
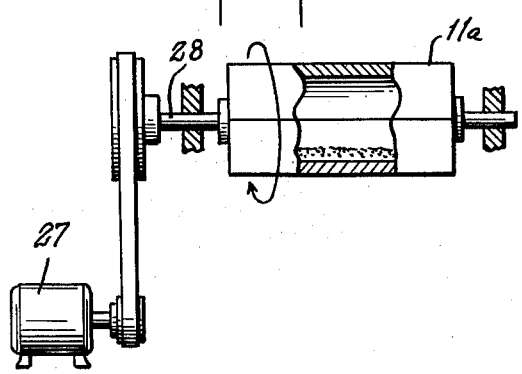
FIG. 5 is an elevational view partly in section of apparatus illustrating another modification thereof.
Figure 6:
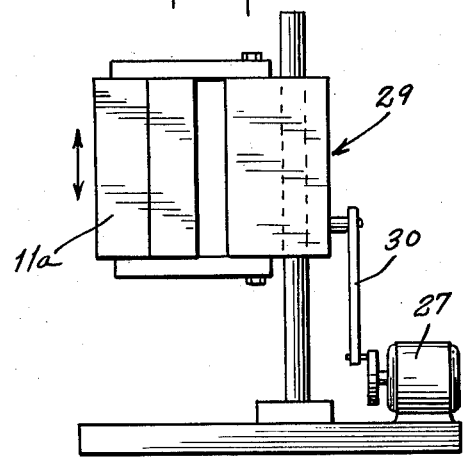
FIGS. 6 and 7 are elevational views of apparatus illustrating further modifications thereof.
Figure 7:
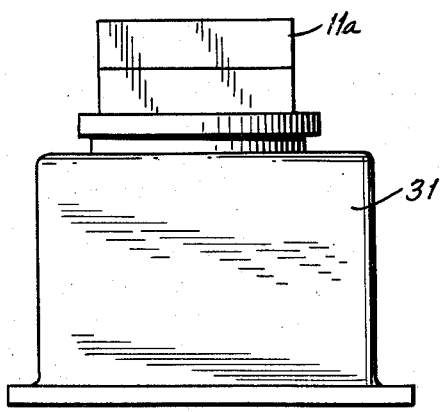

In FIGS. 5 to 7 split molds 11a are shown which are chargd with a quantity of resinous particles in the manner just described, and are then subjected to a movement for effecting distribution of the resinous particles.

In FIG. 5, rapid rotation of the closed mold 11a is effected by a motor 27 for driving shaft means 28 on which the mold is supported to distribute the powder by centrifugal force onto the inner walls of the mold.

In FIG. 6, the mold 11a is agitated like a cocktail shaker by mechanism 29 driven by a motor 27 through an eccentric 30.

In FIG. 7, the mold 11a is agitated by a multivibrator 31.

From the foregoing description, it will be seen that the present invention provides a simple and economical manner of molding hollow plastic resin articles.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. Apparatus for molding a hollow article, which apparatus comprises a mold having an opening, means for supporting said mold with its opening facing downwardly, a receptacle having an inlet at its lower end and an outlet at its upper end, a perforated partition in said receptacle for dividing said receptacle into upper and lower sections and for supporting a mass of finely divided plastic resin particles thereon, means for introducing a gaseous medium under pressure into said inlet, means extending from within said mold to substantially the upper surface of said partition and through said outlet for conducting resin particles into said mold and for distributing the particles within said mold to deposit the same substantially uniformly on the inner walls of said mold, and means for heating said mold to cause the particles to be converted to a resinous layer constituting the walls of the hollow article.

2. Apparatus according to claim 1, wherein the said perforated partition includes perforations of a size to prevent the particles from passing therethrough.

3. Apparatus according to claim 1, wherein said particle conducting means is a tube having a bore dimensioned to conduct particles at a predetermined rate for a given pressure at which the gaseous medium is introduced.

4. Apparatus according to claim 3, including a valve for controlling the flow of gaseous medium into said lower receptacle section.

References Cited by the Examiner

UNITED STATES PATENTS

| | | | |
|---|---|---|---|
| 2,149,879 | 3/39 | Mitchell | 18—58 X |
| 2,285,370 | 6/42 | Staelin | 264—309 |
| 2,346,784 | 4/44 | Pollack | 18—58.3 X |
| 2,736,925 | 3/56 | Heisler et al. | |
| 2,745,141 | 5/56 | Brennan. | |
| 2,810,989 | 10/57 | Terry | 18—58 X |
| 2,885,733 | 5/59 | Chupa | 18—58 X |
| 2,896,263 | 7/59 | Frederick et al. | 18—1 X |
| 2,915,788 | 12/59 | Engel | 18—58 |
| 2,935,765 | 5/60 | Ciampolini | 18—58 |
| 2,967,331 | 1/61 | Kaspar. | |
| 2,991,506 | 7/61 | Crandall | 18—58 X |
| 3,030,668 | 4/62 | Taylor | 18—58.3 |

FOREIGN PATENTS

| | | |
|---|---|---|
| 589,477 | 12/59 | Canada. |
| 845,059 | 8/60 | Great Britain. |

ROBERT F. WHITE, *Primary Examiner.*

MICAEL V. BRINDISI, *Examiner.*